US010048911B2

(12) United States Patent
Komano

(10) Patent No.: US 10,048,911 B2
(45) Date of Patent: Aug. 14, 2018

(54) PARALLEL PROCESSING OF IMAGE DATA

(71) Applicant: CANON KABUSHIKI KAISHA, Tokyo (JP)

(72) Inventor: Yusuke Komano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/963,615

(22) Filed: Dec. 9, 2015

(65) Prior Publication Data
US 2016/0170688 A1 Jun. 16, 2016

(30) Foreign Application Priority Data

Dec. 11, 2014 (JP) ................. 2014-251339

(51) Int. Cl.
G06K 15/02 (2006.01)
G06F 3/12 (2006.01)
H04N 1/034 (2006.01)
B41J 29/38 (2006.01)

(52) U.S. Cl.
CPC .............. *G06F 3/126* (2013.01); *B41J 29/38* (2013.01); *G06F 3/1229* (2013.01); *G06F 3/1286* (2013.01); *G06K 15/1857* (2013.01); *H04N 1/034* (2013.01); *G06K 2215/0094* (2013.01)

(58) Field of Classification Search
CPC ........................... G06F 3/126; G06K 15/1857

USPC ................................................. 358/1.15, 1.16
See application file for complete search history.

(56) References Cited

U.S. PATENT DOCUMENTS

| 8,203,733 | B2* | 6/2012 | Isaka | G06T 1/20 358/1.15 |
| 8,310,713 | B2* | 11/2012 | Sugimoto | G06F 17/211 358/1.15 |
| 2011/0001992 | A1* | 1/2011 | Kajihara | H04N 1/60 358/1.9 |
| 2013/0050739 | A1* | 2/2013 | Oshima | G06F 3/1234 358/1.14 |

FOREIGN PATENT DOCUMENTS

JP 2001157049 A 6/2001

* cited by examiner

*Primary Examiner* — Eric A Rust
(74) *Attorney, Agent, or Firm* — Canon U.S.A., Inc. IP Division

(57) ABSTRACT

An image processing apparatus includes a management unit and a plurality of image processing modules. Each of the image processing modules performs image processing. The management unit manages a processing status of each of the image processing modules. The number of colors and the number of pixels for each of the colors are set as a processing unit for each of the image processing modules, and each of the image processing modules starts the image processing using the processing unit which is set, on the basis of the processing status of a previous image processing module among the processing statuses managed by the management unit.

7 Claims, 7 Drawing Sheets

PARALLEL PROCESSING OF IMAGE DATA

BACKGROUND OF THE INVENTION

Field of the Invention

The present invention relates to an image processing apparatus and a control method for the image processing apparatus which process image data.

Description of the Related Art

High-speed and high-quality image formation is required in recording apparatuses. To achieve this, image processing suitable for properties of a recording apparatus, such as the colors of ink droplets and the dot diameter for forming an image, needs to be performed at high speed. In Japanese Patent Laid-Open No. 2001-157049, a method is disclosed in which multiple image processing modules are used to perform image processing. Specifically, an image processing apparatus includes the multiple image processing modules, a buffer memory, and a first-in first-out (FIFO) memory. Output data which is a processing result from an image processing module is transferred to the next image processing module via the buffer memory sequentially by a predetermined data amount. At that time, a pointer indicating the storage position of the output data in the buffer memory is transferred to the next image processing module via the FIFO memory.

To achieve high-quality image formation, a recording apparatus needs to perform various types of image processing, such as image processing using each color and multiple colors, image processing using a 4×4 pixel grid unit and a 256×256 pixel grid unit. However, as in Japanese Patent Laid-Open No. 2001-157049, in the case where data is transferred between image processing modules by specifying the storage position of data by using the FIFO memory, a common processing unit needs to be used in each of the image processing modules. For example, if processing using a multiple-color 256×256 pixel grid unit needs to be performed in any image processing module in a series of image processing, another image processing module for which a processing capacity of performing a process using a monochrome 4×4 pixel grid unit is sufficient needs to be formed as a circuit handling processing using a multiple-color 256×256 pixel grid unit. Therefore, there arises a problem of an increase in circuit size. In addition, data is transferred between image processing modules in a unit larger than an optimal unit which is originally designed. Therefore, there arise problems of a decrease in processing speed and an increase in memory usage.

SUMMARY OF THE INVENTION

The present invention provides an image processing apparatus including a management unit and a plurality of image processing modules. Each of the image processing modules performs image processing. The management unit manages a processing status of each of the image processing modules. A color count and a pixel count for each of the colors are set as a processing unit for each of the image processing modules, and each of the image processing modules starts the image processing using the processing unit which is set, based on the processing status of a previous image processing module among the processing statuses managed by the management unit.

Further features of the present invention will become apparent from the following description of exemplary embodiments with reference to the attached drawings.

DESCRIPTION OF THE EMBODIMENTS

First Embodiment

An embodiment of the present invention will be described below by using the drawings. The relative location, the apparatus shape, and the like of each of the components of an apparatus used in the embodiment are merely exemplary, and are not seen to be limiting.

Figure 1:
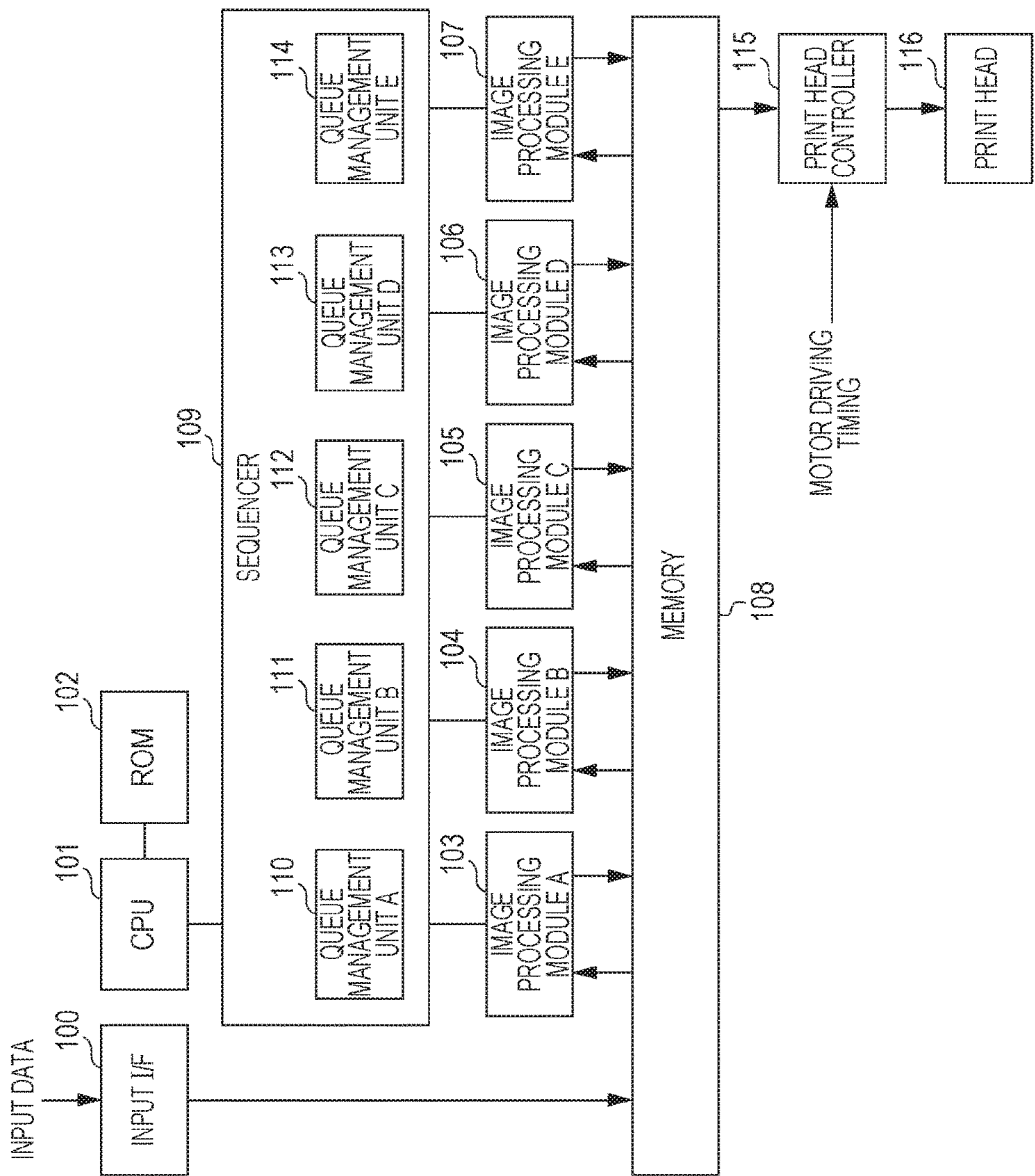
FIG. 1 is a schematic view of an image processing apparatus according to a first embodiment.

FIG. 1 is a schematic view of an image processing apparatus according to an embodiment of the present invention. In FIG. 1, description will be made by taking a printer having a print function, as an example. However, the image processing apparatus is not limited to this. For example, the image processing apparatus does not need to have a print function, or may be a multifunction printer having a print function and a reading function.

As illustrated in FIG. 1, the image processing apparatus includes an input interface (I/F) 100, a central processing unit (CPU) 101, a read-only memory (ROM) 102, multiple image processing modules (103 to 107), a memory 108, a sequencer 109, a print head controller 115, and a print head 116.

The input I/F 100 is an IF for receiving various types of input data such as print image data from an external apparatus, for example, a personal computer or a digital camera.

The CPU 101 which is a central processing unit controls the operations of the entire image processing apparatus in accordance with execution of programs and activation of hardware.

The ROM 102 stores various control programs executed by the CPU 101 and fixed data required for various operations performed by the image processing apparatus. For example, the ROM 102 stores programs for performing a recording (print) process of the image processing apparatus.

The memory 108 is required to operate the CPU 101 or the like. The memory 108 is used as a work area for the CPU 101 or as a temporary storage area for various types of received data, or is used to store various types of setting data. In the first embodiment, as described below, the memory 108 is used to store output results from the image processing modules temporarily. In FIG. 1, the memory 108 is illustrated as one memory. However, this is not limiting. For example, the memory 108 may be constituted by multiple memories having different processing speeds, such as a dynamic random access memory (DRAM) and a static random access memory (SRAM). In the first embodiment, it is assumed that the memory 108 has a DRAM and an SRAM. A DRAM is more inexpensive than an SRAM, whereas an SRAM is capable of reading and writing data at a speed higher than that of a DRAM. In this example, the DRAM is used to store data which is to be input to an image processing module group and data which is to be output from the image processing module group, that is, data which is to be input to an image processing module A 103 and data which is to be output from an image processing module E. Input data (image data) received by the input I/F 100 is input to the image processing module group, and data which is output from the image processing module group is output to the print head controller 115. The SRAM is used as an intermediate buffer which stores data that is input/output between modules of the image processing module group (data which is output from the image processing module A 103 to data which is input to the image processing module E 107).

The sequencer 109 having multiple queue management units (110 to 114) notifies each of the image processing modules that the process is to be started. More specifically, the sequencer 109 manages processing statuses of the image processing modules by using the multiple queue management units, and controls execution (start) of the processes of the image processing modules. In the first embodiment, the sequencer 109 includes five queue management units, i.e., the queue management unit A 110, the queue management unit B 111, the queue management unit C 112, the queue management unit D 113, and the queue management unit E 114, and each of the queue management units notifies a corresponding one of the image processing modules that the process is to be started. The number of queue management units included in the sequencer 109 is not limited to five, and may be less than five or more than six.

The image processing module A 103 to the image processing module E 107, each of which performs different image processing, will be described in detail below. Thus, the image processing apparatus includes the multiple image processing modules which perform image processing. In the first embodiment, the multiple image processing modules included in the image processing apparatus are collectively called an image processing module group.

The print head 116 performs printing on a recording medium on the basis of print data generated by the image processing module group. The print head 116 is included in a print unit which performs various print operations. In the first embodiment, the print head 116 performs print operations by ejecting ink. In addition, the print head controller 115 drives a motor driver (not illustrated) or the like, thereby moving the print head 116 to a print position. Thus, the print head controller 115 controls print operations.

The image processing apparatus described above receives input data (image data) from an external apparatus via the input I/F 100, and the input data is temporarily stored in the memory 108. After that, each of the image processing module A 103 to the image processing module E 107 activated by the sequencer 109 reads data from the memory 108, performs image processing, and writes data obtained through the image processing in the memory 108 again. Each of the image processing modules receives a notification of start of the process from a corresponding one of the queue management units, whereby the process is started. Data which is obtained through image processing and which is output to the memory 108 by the image processing module E 107 which is the final stage of the image processing modules is transferred to the print head 116 as ejection data by the print head controller 115 which is driven in accordance with a motor driving timing. The print head 116 ejects ink droplets to a recording medium on the basis of the transferred data obtained through the image processing, whereby an image is formed on the recording medium.

The image processing performed by each image processing module will be described. First, multi-valued (4 bit) data in 600 dpi is input for each color to the memory 108 as initial data. The image processing module group including the image processing module A 103 to the image processing module E 107 performs a series of image processing described below. A conversion of the multi-valued data in 600 dpi for each of at most four colors into binary data in 1200 dpi, and a conversion into data having a certain density or less are performed. In addition, a conversion in which data around character pixels is thinned out, a conversion in which an image is rotated by 90°, and a conversion in which data is rearranged in the order of ejection operations performed by the print head are performed. The series of image processing performed by the image processing module group are not limited to the above-described processes. The functions of other image processing may be performed.

Individual operations performed by the above-described image processing modules will be described.

The image processing module A 103 reads raster data (multi-valued data in 600 dpi) for each color as initial data, packs the data into a unit (in the first embodiment, a 16×16 pixel grid unit) suitable for efficiency in reading data from a DRAM, and outputs the resulting data to the memory 108.

Then, the image processing module B 104 converts the data received by the image processing module B 104 into an ejection resolution of the print head 116, and outputs the resulting data to the memory 108. Specifically, the image processing module B 104 converts the multi-valued data in 600 dpi which has been subjected to packing, into binary data in ejection resolution of 1200 dpi, and outputs the resulting data to the memory 108. The conversion unit used at that time is desirably a size with which a texture phenomenon of an image is suppressed. In the first embodiment, a 16×16 pixel grid in 600 dpi is processed for each color.

Then, the image processing module C 105 thins out binary data of pixels whose density is equal to or more than a predetermined density (threshold) to suppress nonuniformity in an overlap portion between scans of the print head 116, and outputs the resulting data to the memory 108. In the first embodiment, the relationship of overlap of binary data for all of the colors is checked for each pixel. Binary data of pixels whose density is equal to or more than the threshold and which are viewed as nonuniformity is thinned out so as to have a density less than the threshold, and the resulting data is output to the memory 108 again. The processing unit is desirably a unit suitable to grasp the density of each pixel. In the first embodiment, 32×32 pixel grids in 1200 dpi are processed for all of the colors at a time.

To improve visibility of a character, the image processing module D 106 thins out data of pixels around pixels (also referred to as character pixels) recognized as a character for each piece of image data, then rearranges the resulting data in the array direction of the print head 116, and outputs the resulting data to the memory 108 again. In this example, a process of rotating data by 90° is performed as a process of rearranging the data in the array direction of the print head 116. In the case where two pixels in 1200 dpi are thinned out around the character pixels, the minimum processing unit is a 5×5 pixel grid. If the minimum processing unit is to be based on a power of two in consideration that hardware processing is easily performed, the minimum processing unit is an 8×8 pixel grid. However, the process of thinning out data around the character pixels takes processing time. Therefore, in the first embodiment, 32 pixels are processed at a time in a process of processing data in the horizontal direction. Accordingly, the image processing module D 106 is to process a 32×8 pixel grid for each color.

Finally, the image processing module E 107 performs a conversion of rearranging data in the order of ejection operations performed by the print head 116, and outputs the resulting data to the memory 108. The processing unit is desirably a unit suitable for efficiency in writing data into a DRAM. In the first embodiment, a 32×32 pixel grid in 1200 dpi is processed for each color.

As described above, in the first embodiment, each image processing module uses a different number of pixels (grid unit of pixels) as a processing unit.

Figure 2:
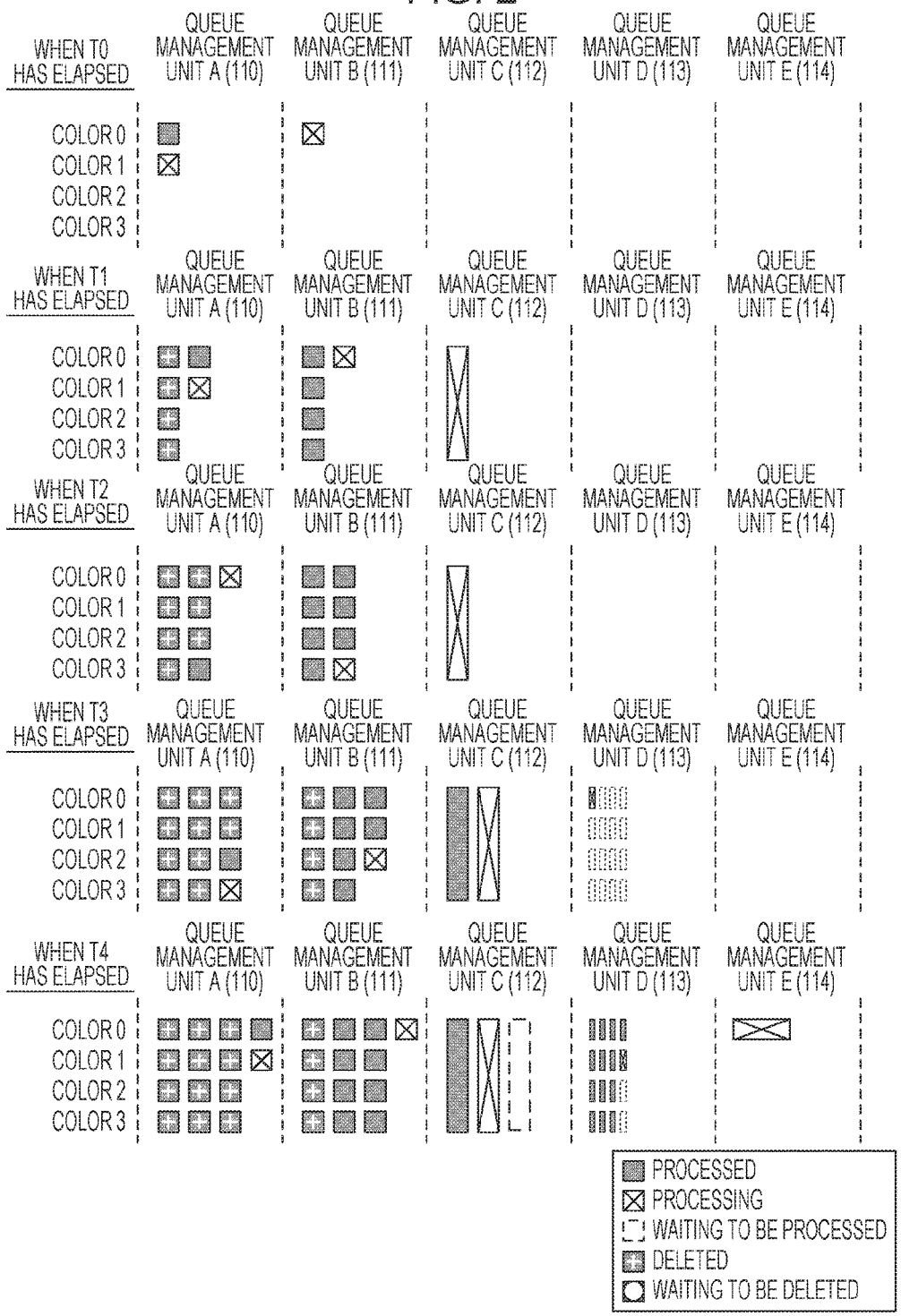
FIG. 2 is a conceptual diagram illustrating processes performed by a sequencer in the image processing mode A according to the first embodiment.

The process performed by the sequencer 109 according to the first embodiment will be described by using FIG. 2. FIG. 2 is a conceptual diagram illustrating the process performed by the sequencer 109, and illustrates process transition in the queue management units for the image processing module group at certain times. In FIG. 2, one queue indicates processing states, each of which corresponds to one cycle of processing performed by the image processing module managed by each of the queue management units. The processing states are classified into five categories, i.e., "waiting to be processed" which indicates a state in which a condition for start of the process has been satisfied, "processing" which indicates a state in which the process is actually being performed, "processed" which indicates a state in which the process has been performed and in which the output result stored in the memory 108 is ready to be used by the next image processing module, "deleted" which indicates a state in which the next image processing module has used the data and in which the output result is not necessary, and "waiting to be deleted" which indicates a state in which the amount of the output results stored in the memory 108 reaches the capacity and in which the data is waiting for end of the use in the next image processing module.

In this classification, the states "processed", "processing", and "waiting to be deleted" are states in which an output result from an image processing module is to be stored in the memory 108. Therefore, these three states are called the active state. Since the memory amount in which output results are stored is finite, each of the queue management units performs management so that the total of processes in the active state is less than a predetermined number. In the first embodiment, it is assumed that the image processing apparatus is capable of performing processing in multiple image processing modes. The image processing mode in which the image processing module group performs processing is set by the CPU 101 in accordance with the image processing performed by the image processing module group. For each of the image processing modules, the CPU 101 specifies the pixel count which is used as a processing unit, and processing information.

The image processing mode A will be described by using FIG. 2. In the image processing mode illustrated in FIG. 2, four colors, colors 0 to 3, are processed. The color 0 is cyan; the color 1 is magenta; the color 2 is yellow; and the color 3 is black. In this image processing mode, data conversion in which data around character pixels is thinned out is not performed in the series of image processing functions. When the image processing module A 103 finishes one cycle of process in which multi-valued data in 600 dpi for one color is packed into a 16×16 pixel grid, the image processing module B 104 performs one cycle of process in which the packed data for one color is converted into a 32×32 pixel grid of binary data in 1200 dpi. When one cycle of process performed by the image processing module A 103 and that performed by the image processing module B 104 are performed for each color, that is, the processes for the four colors are completed, the image processing module C 105 converts data of 32×32 pixel grid (1200 dpi) for the four colors into data whose density is equal to or less than the certain density, at a time. When the image processing module C 105 finishes one cycle of process, the image processing module D 106 divides the 32×32 pixel grid (1200 dpi) into four in the horizontal direction, and rotates the 32×8 pixel grids (1200 dpi) for each color, that is, performs four cycles of rotation process. When the image processing module D 106 finishes four cycles of process for each color, the image processing module E 107 performs the conversion of rearranging data in a 32×32 pixel grid (1200 dpi) in the order of ejection operations performed by the print head, for each color.

The CPU 101 determines the upper limit of the memory usage of the memory 108, which is used for output results which are output from each of the image processing modules, for the image processing module so that the total amount of the output results from the image processing module does not exceed the memory capacity. In this example, the CPU 101 sets an upper limit value of the total of queue items in the active state for each queue management unit. In the first embodiment, the upper limit value for the queue management unit A 110 is 3; the queue management unit B 111, 9; the queue management unit C 112, 8; and the queue management unit D, 16. Since the queue management unit E is the final stage process, "processed" instantaneously becomes "deleted". Therefore, "processed" and "waiting to be deleted" are not present in the active-state queue. Only "processing" is present.

By using FIG. 2, the states of the queues when T0 has elapsed, when T1 has elapsed, when T2 has elapsed, when T3 has elapsed, and when T4 has elapsed will be described.

When T0 has elapsed, the image processing module A 103 has finished one cycle of process for the color 0 (one "processed" in the queue management unit A), and is performing the process for the color 1 (one "processing" in the queue management unit A). Since the image processing module A 103 has finished one cycle of process for the color 0, the image processing module B 104 is performing the process for the color 0 (one "processing" in the queue management unit B).

When T1 has elapsed, the image processing module B 104 has finished one cycle of process for each of the colors 0 to 3 (four "processed" in the queue management unit B), and has started the second cycle of process for the color 0 (one "processing" in the queue management unit B). Since the image processing module B 104 has finished use of the output results from the image processing module A 103 for the colors 0 to 3, the output results for the colors which are obtained in the first cycle of process are not necessary among the output results stored in the memory 108 by the image processing module A 103. Therefore, the unnecessary results have been deleted in the queue in the queue management unit A 110 (four "deleted" in the queue management unit A). The image processing module A 103 has finished the second cycle of process for the color 0, and is performing the second cycle of process for the color 1. Since the image processing module B 104 has finished the first cycle of process for each of the colors 0 to 3, the image processing module C 105 is performing one cycle of process for all of the colors at a time (one "processing" in the queue management unit C).

When T2 has elapsed, a state in which, while the image processing which has been started at T1 and which is performed by the image processing module C 105 continues to be performed, the processes of the image processing module A 103 and the image processing module B 104 are proceeding is present. The image processing module A 103 is performing the third cycle of process for the color 0, and the image processing module B 104 is performing the second cycle of process for the color 3.

When T3 has elapsed, the image processing module D 106 has started the process since the image processing module C 105 has finished the image processing which was started at T1. The image processing module B 104 has finished the second cycle of process for the colors 0 to 3, and the processing condition for the second cycle of process performed by the image processing module C 105 has been satisfied. Therefore, the image processing module C 105 is performing the second cycle of process. Since the output results for the colors which are obtained in one cycle of process performed by the image processing module B 104 become unnecessary at the same time, a corresponding one of the queue items for each color in the queue management unit B 111 has been deleted (four "deleted" in the queue management unit B).

When T4 has elapsed, the image processing module D 106 whose process has been started at T3 and which performs four cycles of process for each color has finished four cycles of process for the color 0 and is performing the fourth cycle of process for the color 1. Since the state of the image processing module D 106 satisfies the processing condition of the image processing module E 107 for the color 0, the image processing module E 107 has started the process for the color 0.

Figure 3:
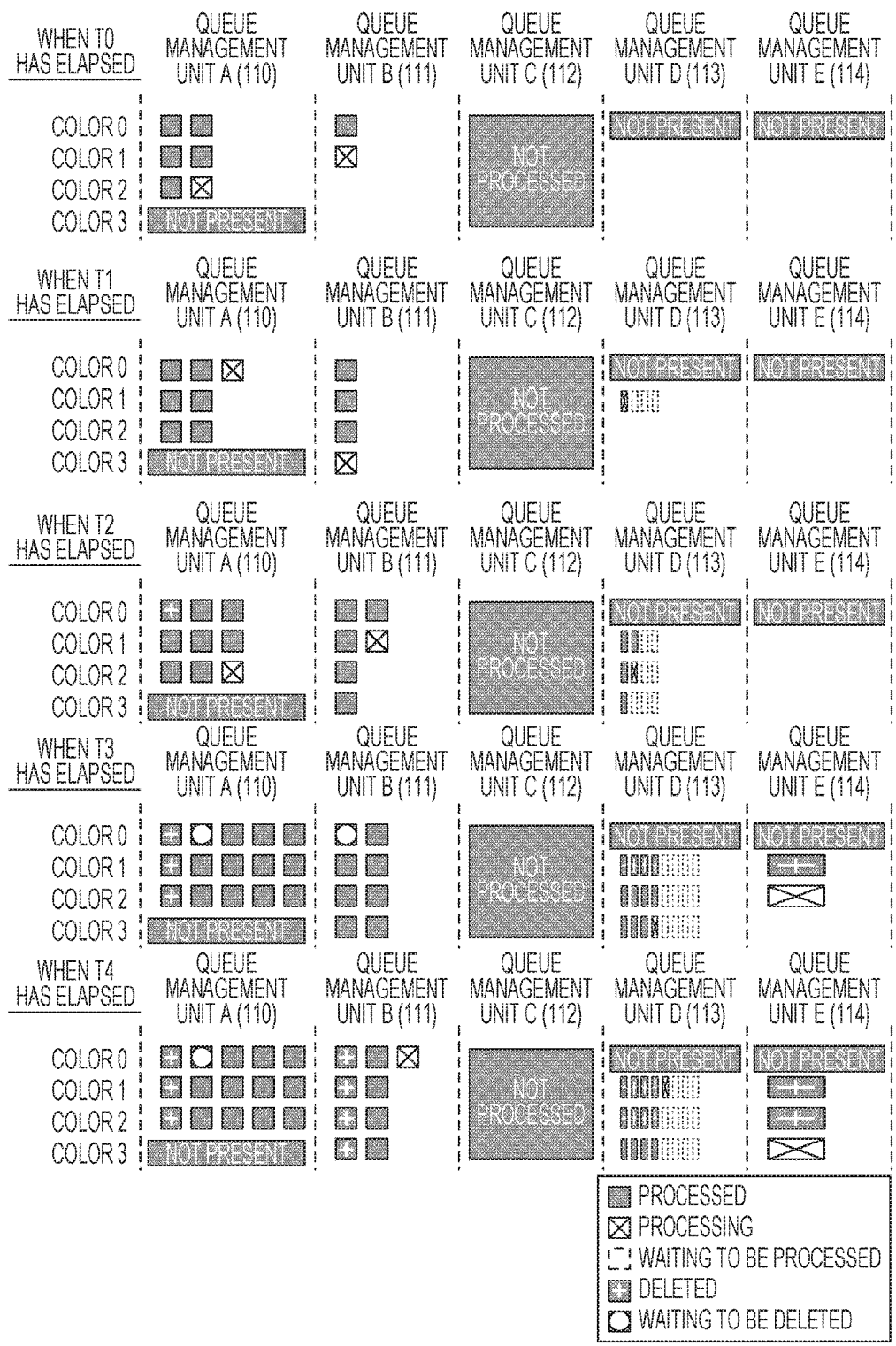
FIG. 3 is a conceptual diagram illustrating processes performed by the sequencer in the image processing mode B according to the first embodiment.

The image processing mode B which is a mode different from the image processing mode A will be described by using FIG. 3. FIG. 3 illustrates processing states of the image processing module A 103 to the image processing module E 107 at elapsed times.

In the image processing mode B, regarding the number of colors, the colors 0 to 2 are received, and three colors, the colors 1 to 3, are output. The color 0 is not information about a specific color, and is character information indicating whether or not this is a character. The colors 1 to 3 are information about color: the color 1 is gray; and the color 2 and the color 3 are obtained by dividing black which is input as the color 2, into two colors, the color 2 and the color 3, through binarization. By dividing a color (in this example, by dividing black into the color 2 and the color 3), for example, ink droplets are ejected from the print head 116 at time intervals. In the image processing mode B, unlike the image processing mode A, the conversion into data having a certain density or less is not performed among the series of image processing. However, the data conversion in which data around character pixels is thinned out is performed. An example of the method of thinning out data around character pixels is a method in which character information in the color 0 is used to specify pixels for a character and in which data around the character pixels is thinned out in the colors 1 to 3. To thin out data around character pixels, a one-pixel (600 dpi) portion which serves as an extra margin is necessary. Therefore, after the image processing module A 103 packs data into a 16×16 pixel grid (600 dpi), the image processing module B 104 includes the left and right sides of the packed data, and uses a 18×16 pixel grid (600 dpi) as input/output data for one cycle. The image processing module D 106 uses the data which is output from the image processing module B 104, to perform the process of thinning out data around character pixels. In the image processing mode B, as described above, the conversion into data having a certain density or less is not performed. Therefore, the image processing module C 105 does not perform the process.

The image processing module A 103 packs data into multi-valued data (4 bit) composed of a 16×16 pixel grid (600 dpi), for each color. The image processing module B 104 refers to the output results for the same color which are obtained before and after one piece of packed data among the output results from the image processing module A 103, and converts multi-valued data composed of a 18×16 pixel grid (600 dpi) into binary data composed of a 36×32 pixel grid (1200 dpi). The output results for the same color which are obtained before and after one piece of packed data are referred to because extra margins are needed. When the image processing module B 104 finishes one cycle of process for each color, the image processing module C 105 does not perform the process, and the image processing module D 106 performs four cycles of process for each color on the 36×8 pixel grids which are obtained by dividing the resulting data into four in the horizontal direction. Since the color 0 is character information, when the image processing module B 104 has simply finished the process for the color 0, the image processing module D 106 is not activated. When the image processing module B 104 has finished the process for the color 1 and its subsequent colors, the image processing module D 106 starts the process, and thins out data around character pixels. After obtaining a 32×8 pixel grid (1200 dpi) by deleting the extra margins, the image processing module D 106 performs 90° rotation. The character information is not used in the subsequent processes. Therefore, the color 0 is not output. When the image processing module D 106 has finished four cycles of process for each color, the image processing module E 107 performs one cycle of conversion of rearranging data in the order of ejection operations performed by the print head, for each color on a 32×32 pixel grid (1200 dpi).

In the image processing mode B, as the upper limit value of the total of queue items in the active state in a queue management unit, 12 is set for the queue management unit A 110; 8, for the queue management unit B 111; 12, for the queue management unit D; and 1, for the queue management unit E.

By using FIG. 3, the states of the queues when T0 has elapsed, when T1 has elapsed, when T2 has elapsed, when T3 has elapsed, and when T4 has elapsed will be described.

When T0 has elapsed, the image processing module A 103 has finished one cycle of process for each of the colors 0 to 2, has finished the second cycle of process for the color 0 and the color 1, and is performing the process for the color 2. The image processing module A 103 has finished the second cycle of process until the color 1. That is, for the color 0 and the color 1, output of anterior and posterior pixels including extra margins has been finished. Therefore, the image processing module B 104 has performed the process for the color 0, and is performing the process for the color 1. At T0, since the process performed by the image processing module B 104 is the first cycle, the previous process is not present. Therefore, the image processing module B 104 starts the process in response to completion of two cycles of process performed by the image processing module A 103. Since the activation condition for the color 0 that the image processing module B 104 has finished the process until the color 1 is not satisfied, the image processing module D 106 has not started the process.

When T1 has elapsed, the image processing module B 104 has finished one cycle of process for each of the colors 0 to 2, and is performing the process for the color 3 by using the output result obtained for the color 2 from the image processing module A 103. Since the image processing module B 104 has finished the process for the colors 0 to 1, the image processing module D 106 is performing the process for the color 1.

When T2 has elapsed, the image processing module B 104 has finished one cycle of process for each of the colors 0 to 3, has finished the second cycle of process for the color 2, and is performing the second cycle of process for the color 1. Since the image processing module B 104 has finished the second cycle of process for the color 0, the processing result for the first cycle of process of the image processing module A 103 is not needed. The queue management unit A 110 has deleted one queue item for the color 0. In the queue management unit B 111, the total of queue items in the active state is 6 which does not reach the upper limit value of 8. The queue is not full.

When T3 has elapsed, at a time point at which the image processing module B 104 has finished two cycles of process for each of the colors 0 to 3, the total of queue items in the active state reaches the upper limit value of 8 in the queue management unit B 111. The queue is full. At that time, the image processing module B 104 is waiting for deletion of a queue item, and is temporarily stopped. In response to this, the process of the image processing module A 103 is similarly waiting for deletion of a queue item, and is temporarily stopped.

When T4 has elapsed, proceeding of the process of the image processing module D 106 causes the full state of the queue of the queue management unit B 111 to be released. The process of the image processing module B 104 which was temporarily stopped at T3 has restarted. The image processing module A 103 is still waiting for deletion of a queue item since the process of the image processing module B 104 has just restarted and it is not possible to delete the output result.

In the first embodiment, as in the image processing mode A and the image processing mode B, even when the relationship among the image processing modules for an image processing mode is different from that for another image processing mode, the same hardware configuration may be used by switching the setting for queue management. Thus, in an image processing module group having multiple image processing modules, each of the image processing modules does not depend on the processing units of the previous and next image processing modules, whereby the configuration of each of the image processing modules may be determined on the basis of the processing scale and the throughput of the image processing module. The activation condition may be set for each image processing module depending on the previous image processing module, and a pipeline process between image processing modules may be performed at higher speed. Thus, each image processing module may perform image processing using a different processing unit. Without an increase of the circuit size of an image processing module included in the image processing module group, processing may be performed at high speed.

Since setting of the queue management may be switched, the upper limit of the output data amount for each image processing module which is stored in the memory 108 may be changed depending on the image processing mode.

Figure 4:
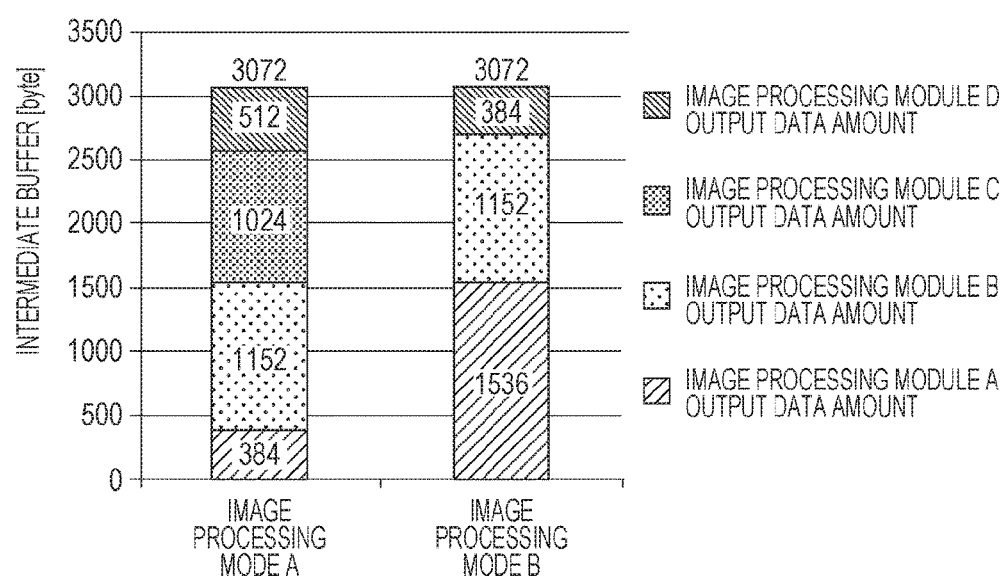
FIG. 4 is a diagram illustrating the amounts of an intermediate buffer required in the image processing mode A and the image processing mode B according to the first embodiment.

FIG. 4 illustrates the output data amount required as an intermediate buffer (SRAM) which is used between image processing modules in the image processing mode A and the image processing mode B. The intermediate buffer amount (output data amount) is obtained by multiplying the upper limit value of the total of queue items in the active state in each of the queue management units by the size of output data which is output from a corresponding one of the image processing modules at the same time. For example, in the case of the image processing module A 103 in the image processing mode A, output data which is output at the same time is 128 byte (multi-valued data (4 bit) composed of a 16×16 pixel grid (600 dpi)), and the upper limit value of the queue items in the active state is three. By multiplying these, it is seen that the image processing module A 103 in the image processing mode A needs to allocate capacity of 384 byte in the intermediate buffer. With similar calculation, the required total amount of the intermediate buffer amounts for the image processing module A 103 to the image processing module E 107 is 3072 byte in the image processing mode A, and 3072 byte in the image processing mode B. These values are smaller than the addition result of the maximum value of the intermediate buffer amount for the image processing modules, 4224 byte (=1536+1152+1024+512). Thus, it is seen that switching of the setting of the queue management enables reduction in memory usage of the SRAM.

Figure 5:
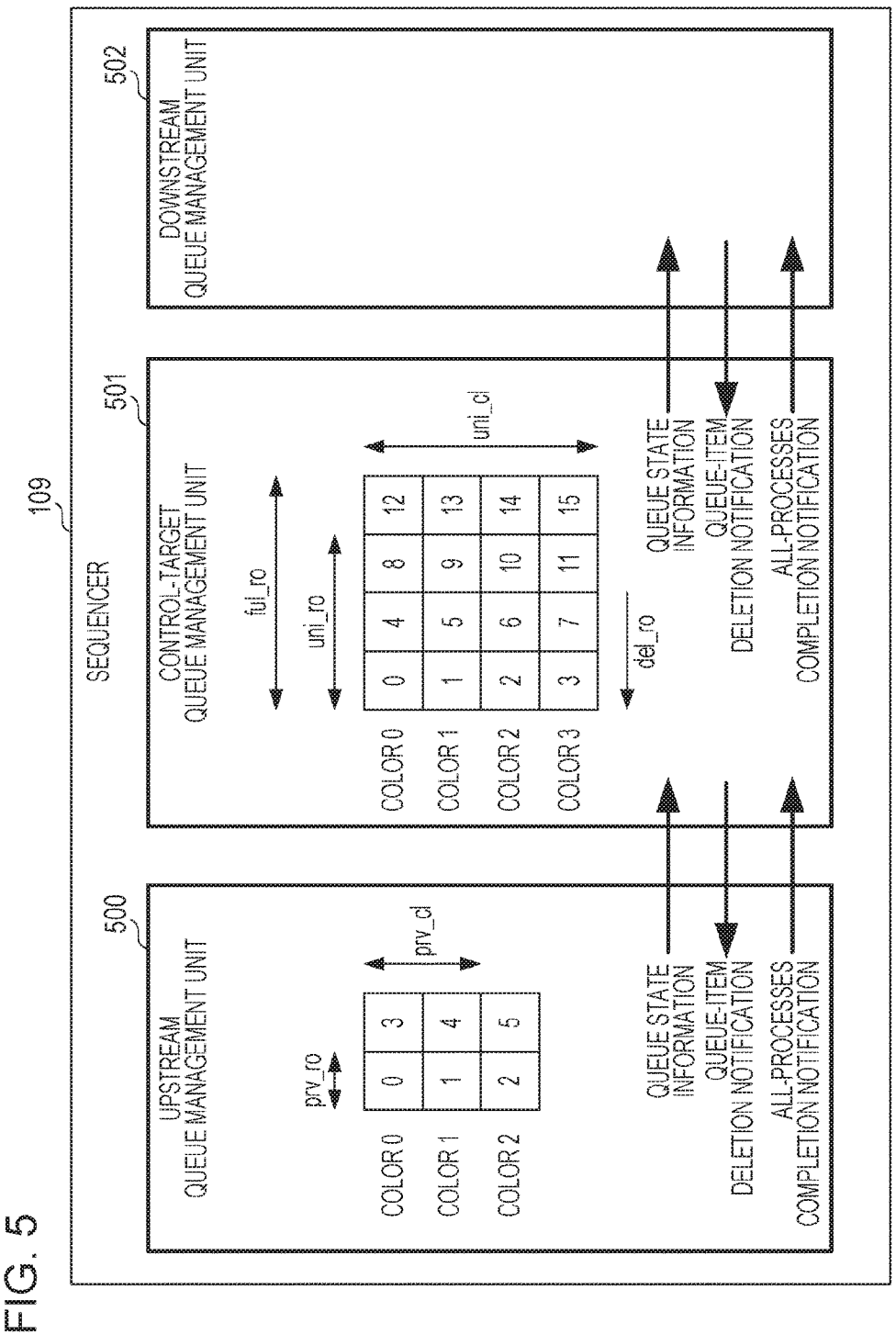
FIG. 5 is a conceptual diagram illustrating the configuration of the sequencer according to the first embodiment.

FIG. 5 is a diagram illustrating the configuration of queue management units achieving the operations in these various image processing modes. As illustrated in FIG. 5, the sequencer 109 includes a control-target queue management unit 501, its upstream queue management unit 500, and its downstream queue management unit 502. This schematically illustrates a part of the image processing circuit (the image processing module A 103 to the image processing module E 107) in FIG. 1. In the case where the queue management unit B 111 is the control target, the queue management unit B 111 serves as the control-target queue management unit 501, the queue management unit A 110 serves as the upstream queue management unit 500, and the queue management unit C 112 serves as the downstream queue management unit 502. Similarly, in the case where the queue management unit C 112 is the control target, the queue management unit C 112 corresponds to the control-target queue management unit 501, the queue management unit B 111 corresponds to the upstream queue management unit 500, and the queue management unit D 113 corresponds to the downstream queue management unit 502. In the case where the queue management unit D 113 is the control target, the queue management unit C 112 corresponds to the upstream queue management unit 500, and the queue management unit E 114 corresponds to the downstream queue management unit 502.

The symbols prv_ro and prv_cl illustrated in FIG. 5 indicate a processing condition which is to be satisfied in the previous image processing module when the control-target queue management unit 501 is to perform the process. The symbol prv_ro indicates the number of processes which need to be finished by the previous image processing module, and the symbol prv_cl indicates the number of colors which need to have been processed by the previous image processing module. In FIG. 5, prv_ro=1, and prv_cl=2. In FIG. 5, a number in a grid indicates the execution order of the process in a corresponding one of the queue management units. In this example, when the upstream queue management unit 500 has performed the process on the queue items until No. 1, the activation condition for No. 0 item (the first cycle of process for the color 0) in the control-target queue management unit 501 is satisfied. The progress of processing on queue items in the upstream queue management unit 500 may be grasped from queue state information notified to the control-target queue management unit 501 from the upstream queue management unit 500. That is, the process condition of the queue of the previous queue management unit is notified to the next queue management unit as the queue state information. The notification may be transmitted every time the progress condition of the queue is changed, or the notification may be transmitted at predetermined intervals. When the upstream queue management unit 500 has performed the process on queue items until No. 2, the activation condition for the No. 1 item (the first cycle of process for the color 1) in the control-target queue management unit 501 is satisfied. The upstream queue management unit 500 may perform no processes on colors up to the maximum number (in this example, the color 3) which are allowed to be processed in the upstream queue management unit 500. For example, as illustrated in FIG. 5, in the case where the upstream queue management unit 500 performs the process only up to the color 2, when the upstream queue management unit 500 has performed the process on queue items until No. 2, the control-target queue management unit 501 determines that the activation condition for the colors 2 to 3 is satisfied (the process has been performed on all of the colors). Thus, the control-target queue management unit 501 may perform the process on queue items until No. 3.

The symbols uni_cl and uni_ro illustrated in FIG. 5 indicate a processing unit. The symbol uni_cl indicates the number of colors handled in one process of the image processing module at a time, and the symbol uni_ro indicates the number of queues handled in one process of the image processing module at a time. That is, uni_ro indicates the number of processes required in one process of the image processing module at a time. The symbol del_ro indicates the number of processed queues which become unnecessary. In FIG. 5, uni_cl=4, uni_ro=3, and del_ro=2 for the image processing module managed by the control-target queue management unit 501.

When the control-target queue management unit 501 has performed cycles of process whose number is equal to uni_ro, for the color which is being processed or all of the colors (whose number is equal to uni_cl), a queue-item deletion notification is transmitted from the control-target queue management unit 501 to the upstream queue management unit 500. When the upstream queue management unit 500 receives the deletion notification, queues whose number is equal to del_ro which is set for the upstream queue management unit 500 are cleared. That is, the output results of the image processing module managed by the upstream queue management unit 500 are deleted from the memory 108. In the example illustrated in FIG. 5, when the control-target queue management unit 501 receives a queue-item deletion notification from the downstream queue management unit 502, the processes of No. 0 to 7 in the control-target queue management unit 501 become unnecessary, and the queues are deleted. That is, the target output results of the image processing module managed by the upstream queue management unit 500 become unnecessary data in the memory 108. It may be determined in advance whether the transmission timing of the queue-item deletion notification is set for each color or for all of the colors. In the case where the setting is made so that the difference is updated for all of the colors, when the control-target queue management unit 501 has performed the process until No. 11, a queue-item deletion notification for the colors 0 to 3 in the upstream queue management unit 500 is transmitted. In the case where the setting is made so that the difference is updated for each color, when the control-target queue management unit 501 has performed the process until No. 8, a queue-item deletion notification for the color 0 is transmitted. When the control-target queue management unit 501 has performed the process until No. 9, a queue-item deletion notification for the color 1 is transmitted. Thus, a queue-item deletion notification for each color is transmitted.

In the case where the difference between the number of processes performed by the upstream queue management unit 500 and that performed by the control-target queue management unit 501 is equal to or larger than ful_ro, and where the state in which the process has been performed on colors whose number is equal to uni_cl continues, the control-target queue management unit 501 regards the queue as being full. The symbol ful_ro indicates the state in which the memory which is present between the control-target image processing module and the next image processing module reaches the capacity. In FIG. 5, ful_ro=4. In this example, when the process of the control-target queue management unit 501 has been performed until No. 15, no more processes may be performed. This state is released in the case where the process of the next image processing module proceeds and where a queue-item deletion notification is transmitted from the downstream queue management unit 502 to the control-target queue management unit 501.

In the case where an all-processes completion notification that all of the processes have been completed is received from the previous image processing module, and where the control-target image processing module may accept operations, the control-target queue management unit 501 transmits an all-processes completion notification to the downstream queue management unit.

In the case where the queue management unit A 110 which is a module in the first stage serves as the control-target queue management unit 501, no modules serve as the upstream queue management unit 500, and the upstream queue management unit 500 always acts as if preparation for the control-target queue management unit 501 is ready. In the case where the queue management unit E 114 which is a module in the final stage serves as the control-target queue management unit 501, no modules serve as the downstream queue management unit 502.

Figure 6A:
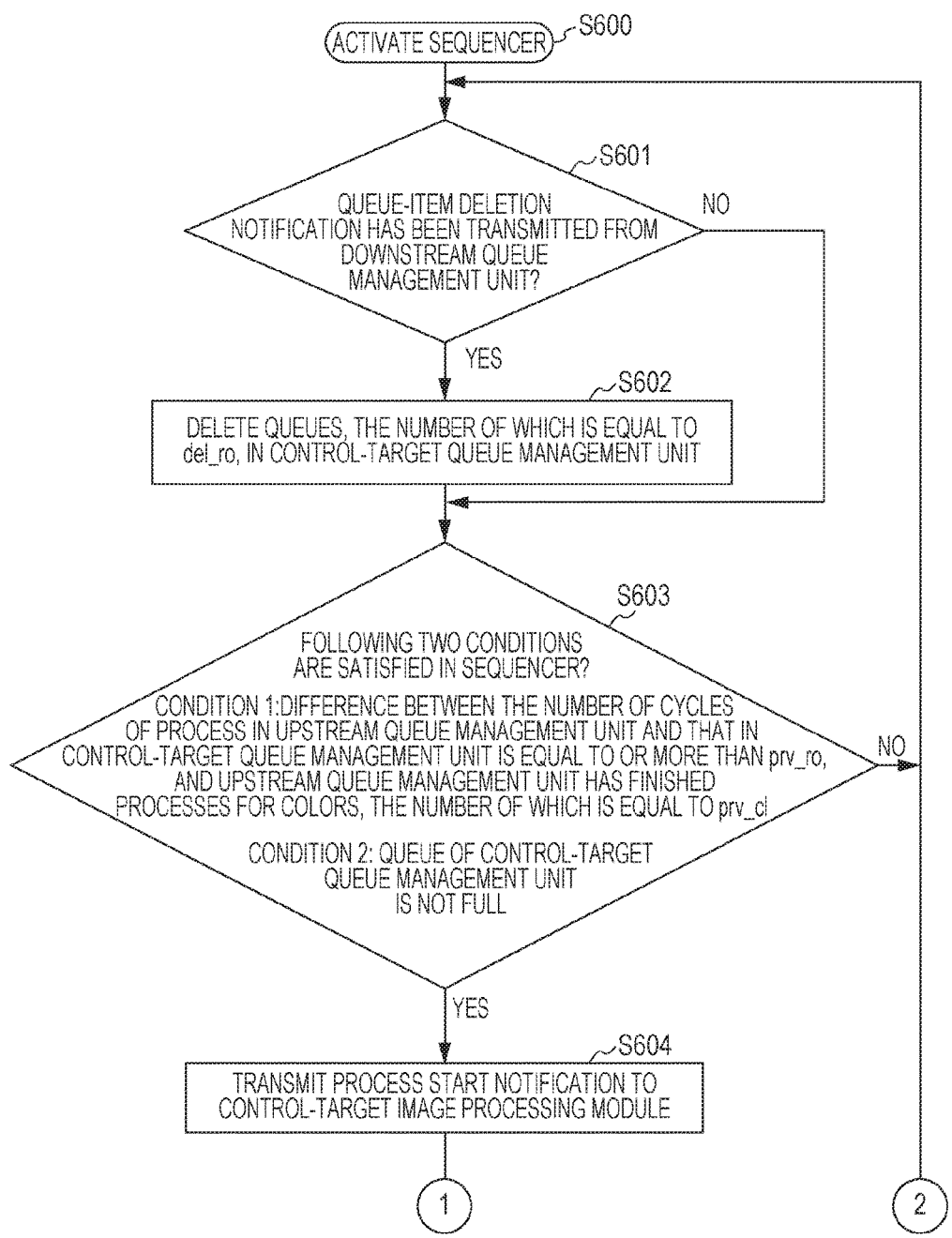
FIGS. 6A and 6B are a flowchart used when the sequencer notifies an image processing module that the process is to start, according to the first embodiment.
Figure 6B:
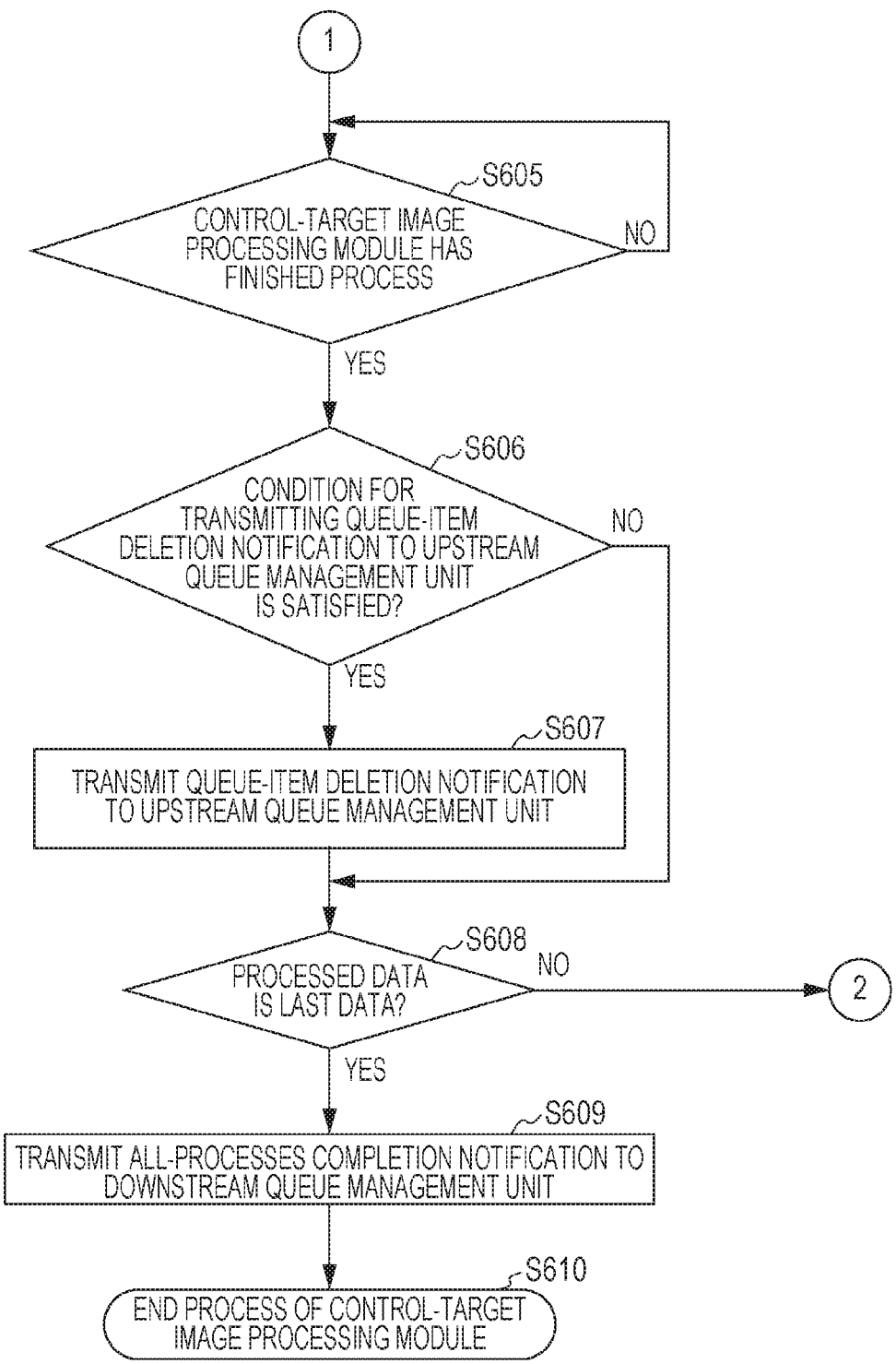

FIGS. 6A and 6B illustrate a flow in which the sequencer 109 illustrated in FIG. 5 uses information from the queue management units to control transmission of a process start notification to a control-target image processing module. The flowchart in FIGS. 6A and 6B illustrates a process flow performed by the CPU 101 which loads control programs stored in the ROM 102, into the memory 108 and which executes the control programs.

When the sequencer is activated (S600), the sequencer 109 determines whether or not a queue-item deletion notification has been transmitted from the downstream queue management unit 502 in S601. If a queue-item deletion notification has been transmitted (YES in S601), queues, the number of which is equal to del_ro, in the control-target queue management unit 501 are deleted in S602, and the process proceeds to S603. If a queue-item deletion notification has not been transmitted (NO in S601), the process proceeds to S603.

In S603, the sequencer 109 determines whether or not processes, the number of which is equal to the processing unit for the processing-target image processing module, have been completed in the previous image processing module of the processing-target image processing module. Specifically, the sequencer 109 determines whether or not the following two conditions are satisfied. The first condition is that, in the queue management information, the difference between the number of cycles of process in the upstream queue management unit 500 and that in the control-target queue management unit 501 is equal to or more than prv_ro, and that the upstream queue management unit 500 has finished processes for colors, the number of which is equal to prv_cl and which are to be processed, in the cycle at the difference prv_ro of the number of cycles of process. The second condition is that the queue of the control-target queue management unit 501 is not full. If these two conditions are satisfied (YES in S603), the process proceeds to S604. If these two conditions are not satisfied (NO in S603), the process returns back to S601.

In S604, the sequencer 109 transmits a process start notification to the control-target image processing module. That is, the sequencer 109 instructs the control-target image processing module to start image processing, and the sequencer 109 waits in S605 until the control-target image processing module has finished the process.

If the control-target image processing module has finished the process (YES in S605), the sequencer 109 determines whether or not the condition for transmitting a queue-item deletion notification to the upstream queue management unit 500 is satisfied in S606. If the condition for transmitting a queue-item deletion notification is satisfied (YES in S606), the sequencer 109 transmits a queue-item deletion notification to the upstream queue management unit 500 in S607. That is, the sequencer 109 instructs the upstream queue management unit 500 to delete queue items, and the process proceeds to S608. If the condition for transmitting a queue-item deletion notification is not satisfied (NO in S606), the process proceeds to S608.

In S608, the sequencer 109 determines whether or not the process data which has been processed in S604 is the last data. If the an all-processes completion notification has been transmitted from the upstream queue management unit 500, and if the queue management information obtained from the upstream queue management unit 500 describes that no queue items in the active state are present, the sequencer 109 determines that the data is the last data.

If the data is the last data (YES in S608), the sequencer 109 transmits an all-processes completion notification to the downstream queue management unit 502 in S609, and ends the process of the control-target image processing module (S610). If the data is not the last data (NO in S608), the sequencer 109 repeatedly performs the processes from S601 to S608 again. Thus, the sequencer 109 has a configuration in which process control parameters for each image processing module are set, whereby the series of image processing performed by the image processing circuit may handle various processing units. That is, for example, a hardware configuration in which various processing units, such as image processing in which single-color processing and multiple-colors processing are present, or image processing in which different pixel grid units are used, are used may be achieved. In the first embodiment, without an increase in circuit size of each image processing module included in the image processing module group, fast-speed and high-quality image processing may be achieved.

Other Embodiments

The present invention is not limited to the above-described embodiment. For example, in the above-described embodiment, the image processing module group may handle multiple processing modes, but this is not limiting. A single processing mode, that is, a fixed processing mode, may be used. In this case, the number of pixels may be set in advance as the processing unit in an image processing module, and the upper limit value of the total of managed queue items may be set in the queue management unit.

In FIGS. 2 and 3, processing for four colors is described as an example, but this is not limiting. In the case where other processing for eight colors or the like is performed, processes similar to those in the above-described embodiment may be performed. Alternatively, the process performed by the image processing module group may handle a single color.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., CPU, micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a ROM, a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-251339 filed Dec. 11, 2014, which is hereby incorporated by reference herein in its entirety.

What is claimed is:

1. An image processing apparatus comprising:
   image processing circuits that are able to perform image processing in each of the image processing circuits in parallel, wherein the image processing circuits include a first image processing circuit and a second image processing circuit, and the first image processing circuit is a previous image processing circuit of the second image processing circuit;
   at least one sequencer processing circuit that manages a processing status of each of the image processing circuits; and
   at least one CPU coupled to at least one memory containing programs that when executed by the at least one CPU, cause the at least one CPU to set a color count and a pixel count of pixels for each color as a processing unit for each of the image processing circuits, based on an image processing mode,
   wherein the sequencer processing circuit causes the second image processing circuit to starts the image processing for the set processing unit without any intervention of processing by the at least one CPU, based on the processing status of the first image processing circuit, and wherein the set processing unit of the first image processing circuit is different from the set processing unit of the second image processing circuit.

2. The image processing apparatus according to claim 1, further comprising:

based on the processing statuses, instructing the second image processing circuit, to start the image processing if the first image processing circuit has finished processes corresponding to the processing unit.

3. The image processing apparatus according to claim 1, wherein, based on the processing statuses, instructing the first image processing circuit to delete processed data if the second image processing circuit has finished a process.

4. The image processing apparatus according to claim 1, wherein information about the number of processed colors and information about a processed-cycle count for each of the image processing circuits is managed.

5. The image processing apparatus according to claim 1, further comprising:

setting a processing unit for each of the image processing circuits, wherein the color count and the pixel count for each color, as a processing unit, is set.

6. The image processing apparatus according to claim 1, wherein in accordance with an image processing mode, the processing unit being set for each of the image processing circuits is changed.

7. The image processing apparatus according to claim 1, further comprising:

determining an upper limit of memory usage used for an output result which is output from each of the image processing circuits.

* * * * *